US009803986B2

(12) United States Patent
Prehofer

(10) Patent No.: US 9,803,986 B2
(45) Date of Patent: Oct. 31, 2017

(54) METHOD AND APPARATUS FOR DETERMINING PREMISES SEMANTICS

(75) Inventor: Christian Prehofer, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 644 days.

(21) Appl. No.: 12/625,251

(22) Filed: Nov. 24, 2009

(65) Prior Publication Data

US 2011/0121963 A1   May 26, 2011

(51) Int. Cl.
| | |
|---|---|
| *G08B 1/08* | (2006.01) |
| *B60R 25/10* | (2013.01) |
| *G06F 7/00* | (2006.01) |
| *G08B 5/22* | (2006.01) |
| *G01S 19/42* | (2010.01) |
| *G01S 19/24* | (2010.01) |
| *G01S 13/88* | (2006.01) |
| *G01C 21/02* | (2006.01) |
| *G01C 17/38* | (2006.01) |
| *G01C 21/30* | (2006.01) |
| *H04W 4/02* | (2009.01) |
| *G01C 21/32* | (2006.01) |

(52) U.S. Cl.
CPC ............ *G01C 21/30* (2013.01); *H04W 4/021* (2013.01); *G01C 21/32* (2013.01)

(58) Field of Classification Search
CPC ... E04B 2/78; E06C 7/08; G06F 17/50; G06F 17/5004; G06F 3/0481; G06F 3/0488; G06F 3/0619; G06F 9/5072; G06F 11/3031; G06F 11/3058; G06F 11/3072; G06F 11/3089; G06F 11/34; G06F 11/3676; G06F 11/3684; G01C 21/206; G01C 21/20; G01C 21/32; H04W 64/00; H04W 4/04; H04W 4/02; H04W 4/021; H04W 4/028; H04W 28/04; H04W 48/16; H04W 4/043; H04W 4/18; H04W 4/20; H04W 4/22; H04W 76/007; H04W 88/06; H04W 8/14; H04W 8/18
USPC ...................................................... 340/539.13
See application file for complete search history.

(56) References Cited

U.S. PATENT DOCUMENTS 5,687,217 A * 11/1997 Bliss ...................... H04W 24/00
379/32.01
6,397,040 B1    5/2002 Titmuss et al.
(Continued)

FOREIGN PATENT DOCUMENTS

| | | |
|---|---|---|
| JP | 2002323326 A | 11/2002 |
| KR | 20040037794 A | 5/2004 |
| WO | WO 03/044755 A1 | 5/2003 |

OTHER PUBLICATIONS

Mike Addlesee et al., Implementing a Sentient Computing System, entire document.*

(Continued)

*Primary Examiner* — Steven Lim
*Assistant Examiner* — Muhammad Adnan
(74) *Attorney, Agent, or Firm* — Core Wireless Licensing Ltd.

(57) ABSTRACT

An approach is provided for generating trace data corresponding to one or more mobile devices detected within a premises, where the trace data specifies movement of the mobile device(s) within the premises. A map customizing platform utilizes the user traces to determine accessibility information about areas within the premises using connecting elements of the premises.

15 Claims, 10 Drawing Sheets

(56) References Cited

U.S. PATENT DOCUMENTS

| | | | | |
|---|---|---|---|---|
| 6,571,193 | B1* | 5/2003 | Unuma | A43B 3/0005 340/853.2 |
| 6,674,403 | B2* | 1/2004 | Gray et al. | 342/463 |
| 6,799,047 | B1* | 9/2004 | Bahl et al. | 455/456.1 |
| 6,850,946 | B1* | 2/2005 | Rappaport et al. | 707/796 |
| 6,898,559 | B2 | 5/2005 | Saitta | |
| 7,259,656 | B1* | 8/2007 | Wright | 340/286.14 |
| 7,263,375 | B2* | 8/2007 | Zavada et al. | 455/456.6 |
| 7,426,197 | B2* | 9/2008 | Schotten et al. | 370/328 |
| 7,587,274 | B2* | 9/2009 | Kaldewey et al. | 701/434 |
| 7,630,943 | B2* | 12/2009 | Nerguizian et al. | 706/20 |
| 7,716,585 | B2* | 5/2010 | Glass | 715/734 |
| 8,174,931 | B2* | 5/2012 | Vartanian et al. | 367/99 |
| 8,706,693 | B2* | 4/2014 | Miyazaki et al. | 707/624 |
| 8,818,706 | B1* | 8/2014 | Ogale | G01C 21/005 340/539.1 |
| 8,825,388 | B2* | 9/2014 | Khorashadi | G01C 21/206 701/26 |
| 9,026,302 | B2* | 5/2015 | Stout | G05D 1/0219 701/25 |
| 9,374,799 | B2* | 6/2016 | Batada | H04W 64/00 |
| 9,485,745 | B2* | 11/2016 | Kurby | H04W 56/00 |
| 9,644,973 | B2* | 5/2017 | James | G01C 21/206 |
| 2005/0124354 | A1* | 6/2005 | Durgin | 455/456.1 |
| 2006/0074494 | A1* | 4/2006 | McFarland | 700/1 |
| 2006/0135183 | A1* | 6/2006 | Zavada et al. | 455/457 |
| 2007/0001904 | A1 | 1/2007 | Mendelson | |
| 2007/0219711 | A1* | 9/2007 | Kaldewey et al. | 701/208 |
| 2007/0260432 | A1* | 11/2007 | Okada | 703/1 |
| 2008/0201112 | A1* | 8/2008 | Bouchard et al. | 703/1 |
| 2009/0043504 | A1* | 2/2009 | Bandyopadhyay et al. | 701/213 |
| 2009/0170529 | A1 | 7/2009 | Kane | |
| 2009/0177437 | A1 | 7/2009 | Roumeliotis | |
| 2009/0228201 | A1* | 9/2009 | Liu | 701/201 |
| 2009/0291641 | A1* | 11/2009 | Sato et al. | 455/67.11 |
| 2009/0325595 | A1* | 12/2009 | Farris | 455/456.1 |
| 2010/0004997 | A1* | 1/2010 | Mehta et al. | 705/14.66 |
| 2010/0021012 | A1 | 1/2010 | Seegers et al. | |
| 2010/0121567 | A1* | 5/2010 | Mendelson | 701/206 |
| 2010/0203876 | A1* | 8/2010 | Krishnaswamy | 455/418 |
| 2010/0235091 | A1* | 9/2010 | Das et al. | 701/208 |
| 2010/0305851 | A1* | 12/2010 | Meyer et al. | 701/208 |
| 2011/0081918 | A1* | 4/2011 | Burdo et al. | 455/456.1 |
| 2011/0090081 | A1* | 4/2011 | Khorashadi et al. | 340/539.13 |
| 2011/0090123 | A1* | 4/2011 | Sridhara | G01S 5/0252 342/450 |
| 2011/0167574 | A1* | 7/2011 | Stout | G05D 1/0219 15/3 |

OTHER PUBLICATIONS

Youssef Kaddoura et al., Cost-Precision Tradeoff in Unencumbered Floor-based Indoor Location Tracking, entire document.*
Author: www.merium-webster.com, title: definition of track, Date Capture: Apr. 30, 2014.*
Author: www.merium-webster.com, title: definition of trace, Date Capture: Apr. 30, 2014.*
Author: Georg Gartner & Andrew Frank and Günther Retscher, Title: Pedestrian Navigation System in Mixed Indoor/Outdoor Environment—The NAVIO Project, Date: Feb. 2004, Pertinent Page: whole document.*
A Mobile Indoor Location-Based GIS Application, Candy. Accessed: Jul. 14, 2010, http://www.cirgeo.unipd.it/cirgeo/convegni/mmt2007/proceedings/papers/candy_jonathan.pdf, pp. 1-6.
Towards a Location Model for Indoor Navigation Support through Public Displays and Mobile Devices, Kray et al. Accessed: Jul. 14, 2010, http://citeseerx.ist.psu.edu/viewdoc/download?doi=10.1.1.143.7742&rep=rep1&type=pdf, pp. 1-5.
Wang, H., et al.: Enhancing the Map Usage for Indoor Location-Aware Systems. Lecture Notes in Computer Science, 2007, pp. 1-10, http://isas.uka.de/Publikationen/HCI07_Wang.pdf.

* cited by examiner

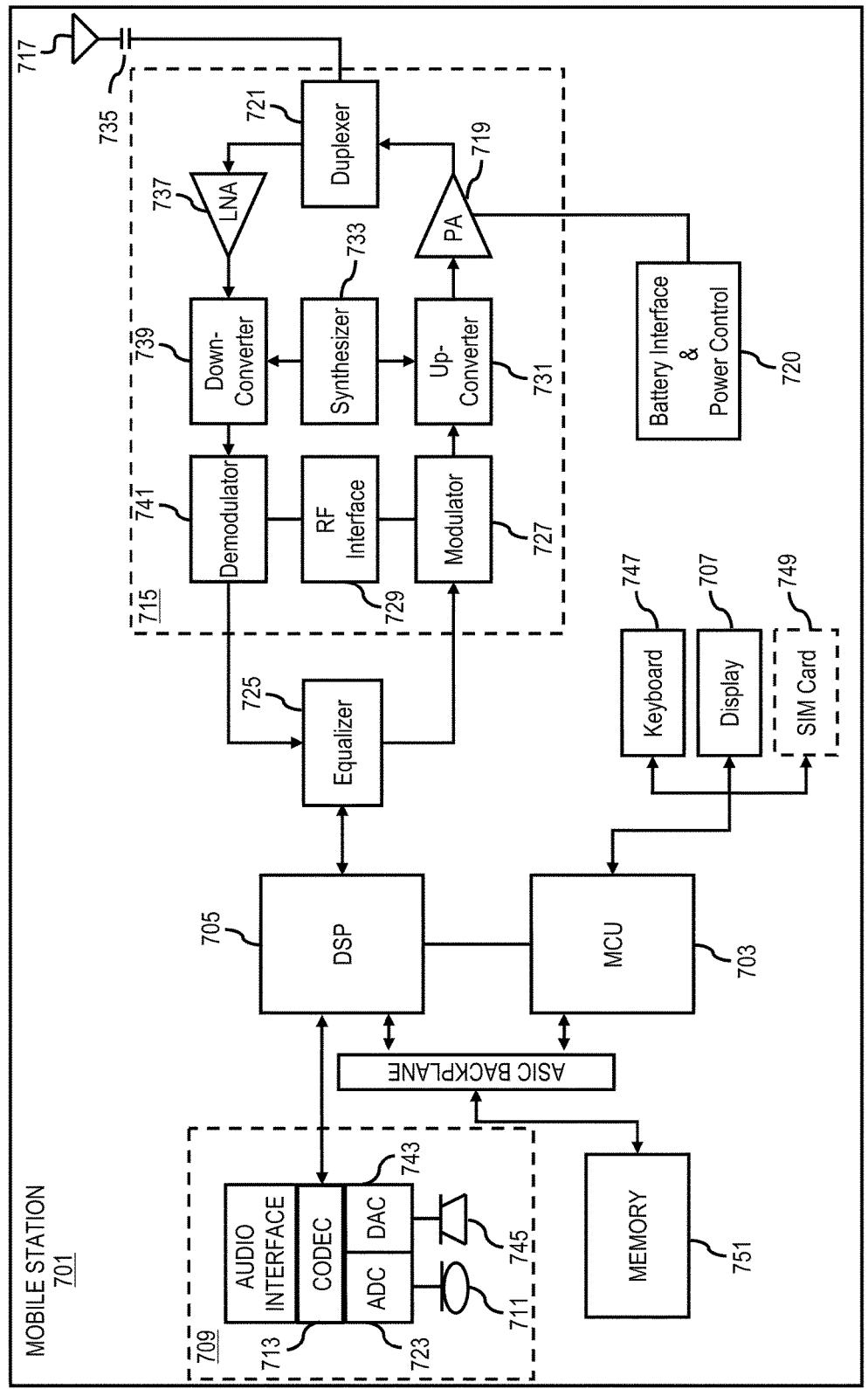

METHOD AND APPARATUS FOR DETERMINING PREMISES SEMANTICS

BACKGROUND

Service providers (e.g., wireless and cellular services) and device manufacturers are continually challenged to deliver value and convenience to consumers by, for example, providing compelling network services and advancing the underlying technologies. One area of interest has been the development of location based services and technologies for providing mapping data that is presented to users by a mapping on mobile devices (e.g., data that is presented on maps and cognitive maps which may be displayed on a user's wireless or cellular device). However, indoor mapping has received little or no attention, in large part, because of the difficulty in coordinating and tracking the location of these mobile devices.

Accordingly, service providers and device manufacturers are challenged to develop new mechanisms for customizing map presentations (e.g., cognitive maps) to display, highlight, or otherwise indicate to a user information identifying connectivity between, and availability of access to, various areas of a premises, such as a building.

SOME EXAMPLE EMBODIMENTS

Therefore, there is a need for an approach for automatically and efficiently providing to various users map presentations identifying accessibility of various areas of a premises, as well as connectivity of areas of the premises, availability of access to the areas, and a manner of access to the areas.

According to one embodiment, a method comprises generating trace data corresponding to one or more mobile devices detected within a premises, wherein the trace data specifies movement of the one or more mobile devices within the premises. The method also comprises determining accessibility information about the premises based on the trace data.

According to another embodiment, an apparatus comprising at least one processor, and at least one memory including computer program code, the at least one memory and the computer program code configured to, with the at least one processor, cause the apparatus to detect presence of one or more mobile devices within a premises and to generate trace data corresponding to the one or more mobile devices, wherein the trace data specifies movement of the one or more mobile devices within the premises. The apparatus is also caused to determine accessibility information about the premises based on the trace data.

According to yet another embodiment, a computer-readable storage medium carries one or more sequences of one or more instructions which, when executed by one or more processors, cause an apparatus to detect presence of one or more mobile devices within a premises and to generate trace data corresponding to the one or more mobile devices, wherein the trace data specifies movement of the one or more mobile devices within the premises. The apparatus is also caused to determine accessibility information about the premises based on the trace data.

According to still another embodiment, an apparatus comprises means for detecting presence of one or more mobile devices within a premises and for generating trace data corresponding to the one or more mobile devices, wherein the trace data specifies movement of the one or more mobile devices within the premises. The apparatus also comprises means for determining accessibility information about the premises based on the trace data.

Still other aspects, features, and advantages of the invention are readily apparent from the following detailed description, simply by illustrating a number of particular embodiments and implementations, including the best mode contemplated for carrying out the invention.

BRIEF DESCRIPTION OF THE DRAWINGS

Examples of a method, apparatus, and computer program for extracting premises semantics from inaccurate indoor user traces are disclosed. In the following description, for the purposes of explanation, numerous specific details are set forth in order to provide a thorough understanding of the embodiments of the invention. In some instances, well-known structures and devices are shown in block diagram form in order to avoid unnecessarily obscuring the embodiments of the invention. It is apparent, however, to one skilled in the art that the embodiments of the invention may be practiced without these specific details or with an equivalent arrangement, all without departing from the spirit and scope of the invention. Accordingly, the description and accompanying drawings are to be regarded as illustrative in nature, and not as restrictive or as limiting the invention.

FIG. 7 is a diagram of a mobile terminal (e.g., a handset) that can be used to implement an embodiment of the invention.

DESCRIPTION OF SOME EMBODIMENTS

Examples of a method, apparatus, and computer program for determining building semantics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
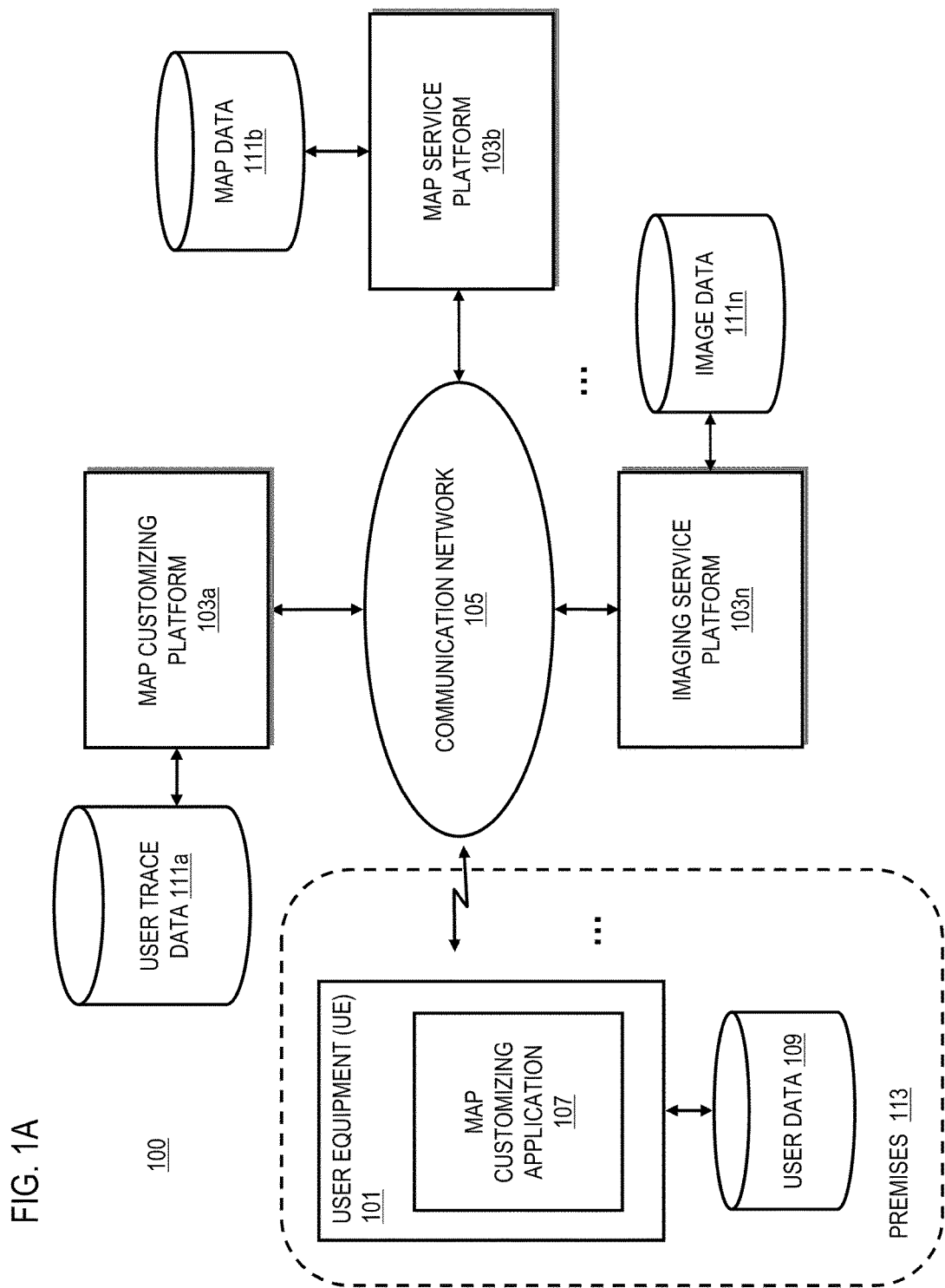
FIGS. 1A-1C are, respectively, a diagram of a system capable of extracting premises semantics from user traces, and flowcharts of the associated processes, according to various embodiments.

FIG. 1A is a diagram of a system capable of extracting premises semantics from user traces, according to one embodiment. It is noted that indoor mapping has traditionally been ignored. In particular, semantic information descriptive of the indoor environment is not provided to (and must be identified by) the user. While known systems suggest the possibility of a user extracting a path from a map structure to walk from one room to another, no approach exists for automatically obtaining connectivity information between areas within a premises, whereby such information is supplied to a user. System 100, in certain embodiments, addresses this need.

Indoor positioning systems, such as Bluetooth®-based or wireless local area network (WLAN)-based systems, are typically less accurate than outdoor systems, which utilize global positioning system (GPS) or satellite technology, for example. Therefore, it has been difficult to obtain and provide position information for indoor systems. Thus, with indoor systems providing less accurate data (accuracy of 10-50 meters is typical) and having no speed or direction indication, determination of the interior environment has not been practical. Approaches thus rely on a manually intensive process for creating and updating map content, and more particularly for providing a semantic description of elements of a premises, such as doors, elevators and stairways and other areas. Even if it were practical to maintain such information, timely updating this information is costly.

It is therefore desirable to obtain information describing which areas of a premises are connected to which other areas and in what way by processing less accurate user traces, in order to generate semantic displays for a map without requiring a user to specify such data manually. Such processing reduces errors or deviations of specific user traces for reasons specific to a particular user's individual characteristics or preferences of movement between areas or sub-areas within a premises.

More particularly, by way of explanation but not limitation, if positioning information were accurate, based on sufficiently large data sets it would be possible to infer from user traces which connecting elements of the premises (doors, elevators, stairways, corridors, etc.) actually connect two areas of the premises (whether on the same or on different floors), as well as to determine at which times of the day or weekday accessibility is available. Such inference, or determination, enables improvement in routing of users within a building. This is more difficult, however, where the accuracy of positioning information is low. In such a circumstance more information about the connecting elements must be used to determine information about building elements. For example, an indoor positioning system may not work when a user is in an elevator. Also, if the positioning accuracy is not sufficient to distinguish between two possible connectors (e.g. two doors or elevators), just a general connectivity of the two areas can be concluded and the user has to find the right way.

Therefore, extracting traffic information and correction of map errors to obtain syntactic data from user traces is more difficult for interior portions of a premises because positioning information is less accurate.

To address this problem, a system 100 of FIG. 1 introduces the capability to automatically collect, from a positioning system operating within an interior of a premises, user trace data descriptive of users' movement between areas or sub-areas of the premises and to extract typical movement patterns between the two areas. Data may be automatically gathered by various sensors and detectors. Alternatively, a user may input his or her location data using the user's cellular or other mobile equipment. The system 100 may use an existing map of the premises to identify options for movement between the areas such as walking, using stairs, escalators or elevators. By matching the movement patterns, the system 100 has the capability to determine whether the areas are connected and to extract or identify the possible connectors therebetween. Moreover, the system 100 may filter user traces for positioning errors by using building information to exclude impossible cases—e.g., floor changes where no elevator, stair or escalator is present.

By way of example, it is contemplated that the system 100 can use any mechanism to collect data on user movement to or within a particular area of the premises. For example, the system 100 can automatically track presence of a user at various areas and the time taken by a user to travel from one area to another using location based services, location markers or beacons at specific locations (e.g., radio frequency identification (RFID) tags, Bluetooth communication, WLAN communication), biometric reading (e.g., facial recognition via security cameras).

As shown in FIG. 1, the system 100 comprises one or more user equipment (UE) 101 having connectivity to a map customizing platform 103a, a map service platform 103b, and an imaging service platform 103n via a communication network 105. The map customizing platform 103a customizes a map according to building semantic data as hereinabove described. The map service platform 103b collects, assembles, stores, updates, and supplies map data and map formats. The imaging service platform 103n processes map data and map formats to present maps of different formats with different visual effects including, but not limited to, 2D, 3D, holographs, animation, miniature sets and models, animatronics, Matte paintings, augmented reality, etc.

Each of the platforms 103a-103n and the UE 101 are connected to their respective databases to access particular types of data they need to execute their respective functions. In one embodiment, the map customizing platform 103a is connected to a user trace database 111a, the map service platform 103b is connected to a map database 111b, the imaging service platform 103n is connected to an image database 111n, and the UE 101 is connected to a user database 109 which may include various information descriptive of the user. For example, users may have different classifications, such as employees, pedestrians, emergency personnel, supervisory personnel, etc. Such classification may be used to filter the semantic data provided to a particular user, so that class related information such as indicated at 130 in FIG. 1B may be provided only to a specific class of user, in this case only to service personnel. Although platforms 103a-103n are shown as separate entities, it is contemplated that one or more platforms can be combined.

The map customizing platform 103a, the map service platform 103b, and the imaging service platform 103n can be implemented via shared or partially shared hardware equipment or different hardware equipments. For the purposes of illustration, the system 100 is explained with respect to the use of three-dimensional (3D) data sets. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, the map customizing platform 103a, the map service platform 103b, and the imaging service platform 103n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 1B:
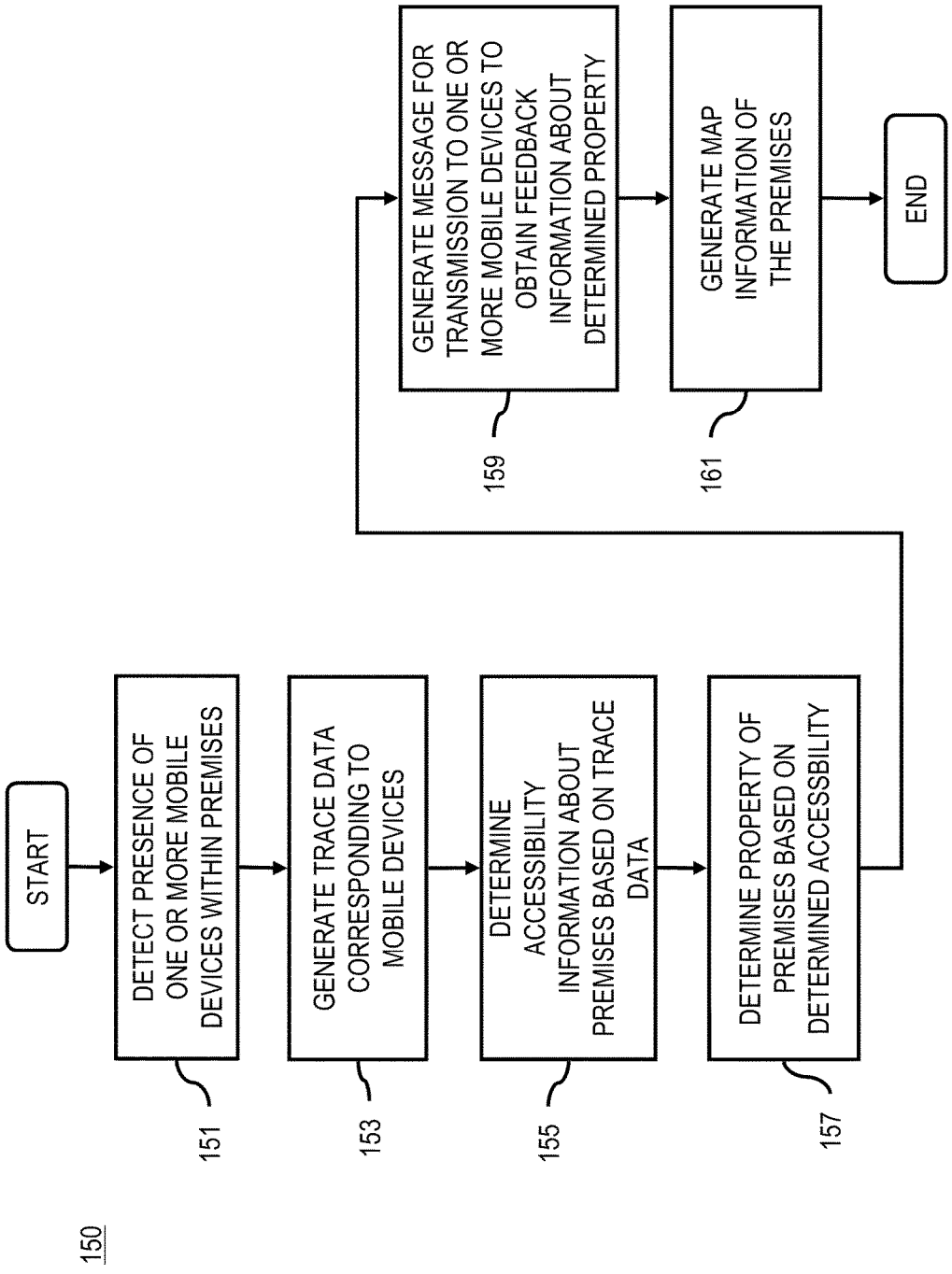

The operation (i.e., processes 150 and 170 of FIGS. 1B and 1C, respectively) of system 100 is now explained with respect to multiple UEs 101 as mobile devices. As seen in FIG. 1B, the presence of the mobile devices 101 within the premises 113 is detected, per step 151. In step 153, trace data is generated corresponding to the mobile devices 101. Accessibility information is determined about the premises 113 based on the trace data (step 155).

Additionally, in step 157, process 150 can determine the property or characteristics of the premises 113. According to certain embodiments, this determined property specifies connectivity between one area to another area—e.g., connectivity of two of the floors by the elevator, the escalator, or the stairway. Also, the process 150 can generate a message for transmission to the mobile devices 101 to obtain feedback information about the determined property, as in step 159. That is, the feedback information can confirm whether the property is indeed one of the premises elements, e.g., doorway, elevator, the escalator, or the stairway. In step 161, map information of the premises can be generated.

According to certain embodiments, the map information can be used to support indoor routing capabilities (e.g., which doors are accessible). Moreover, it is contemplated that such map information can be updated to capture the fact that accessibility within the building or premises can change with time. Namely, at certain time of the day, doors or passage ways may not be available for access. For example, during business hours, when most businesses are opened, movement throughout the building would be more free relative to when businesses are closed. Additionally, the map information can reflect temporary conditions, e.g., construction, security, etc.

Figure 1C:
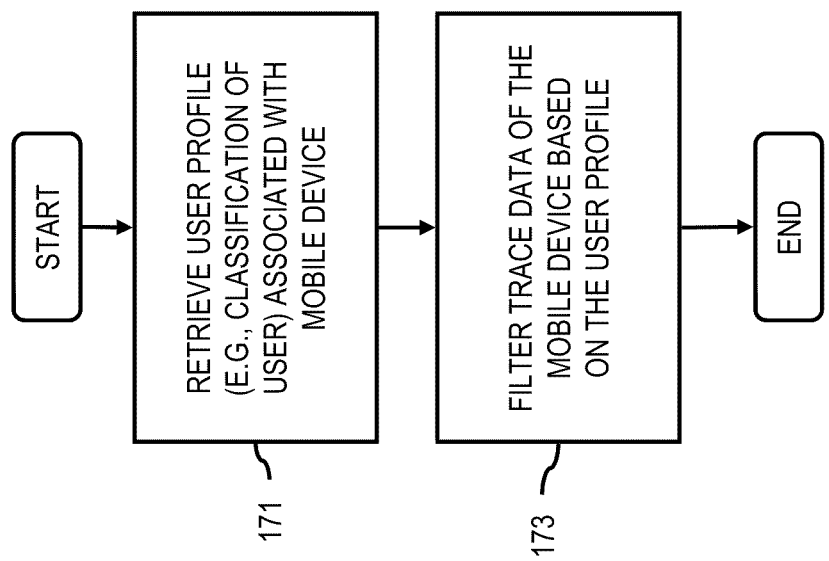

Furthermore, in one embodiment, information about the user of the mobile devices 101 can be factored into the determination of the map information. As shown in FIG. 1C, process 170 involves retrieval of a user profile associated with a particular one of the mobile devices 101 (step 171). The user profile, for example, can specify a certain classification or role of the user with respect to the user's mobility within the premises 113. For instance, if the user is a security guard, then most likely the user would have access to most (if not all) areas of the premises 113. Namely, the user would have unrestricted mobility. By contrast, if the user is an entry-level employee, this user's mobility would be significantly restricted. Hence, the user profiled (e.g., classification of the user) can be used to filter the trace data, as to influence how the map information is generated, as in step 173. In this manner, a particular user will be provided with a more restricted map of the premises 113, while another user can be presented with a map with greater freedom in terms of mobility within the premises 113.

Figure 2A:
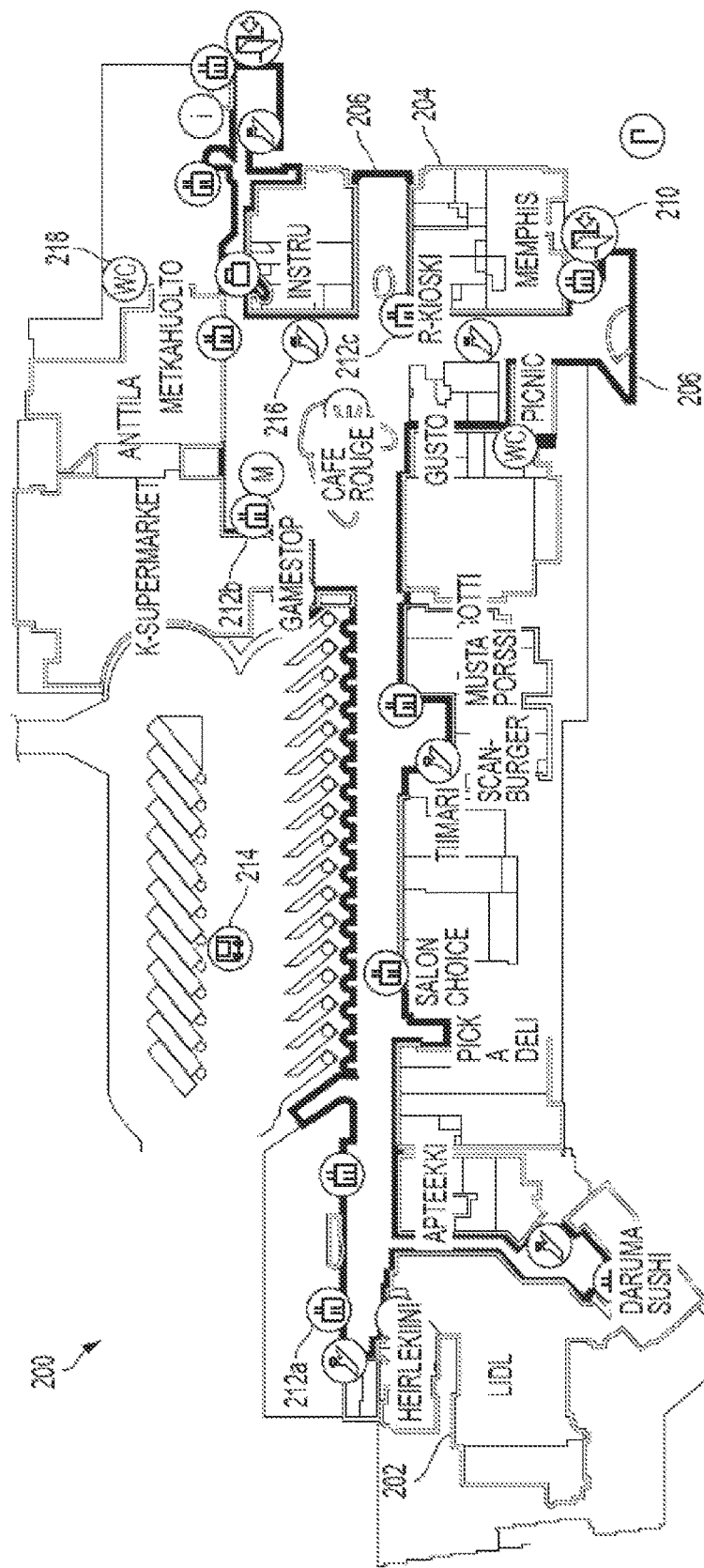
FIGS. 2A and 2B are diagrams illustrative of a map of an interior area of a premises in which building semantics can be determined, according to one embodiment.
Figure 2B:
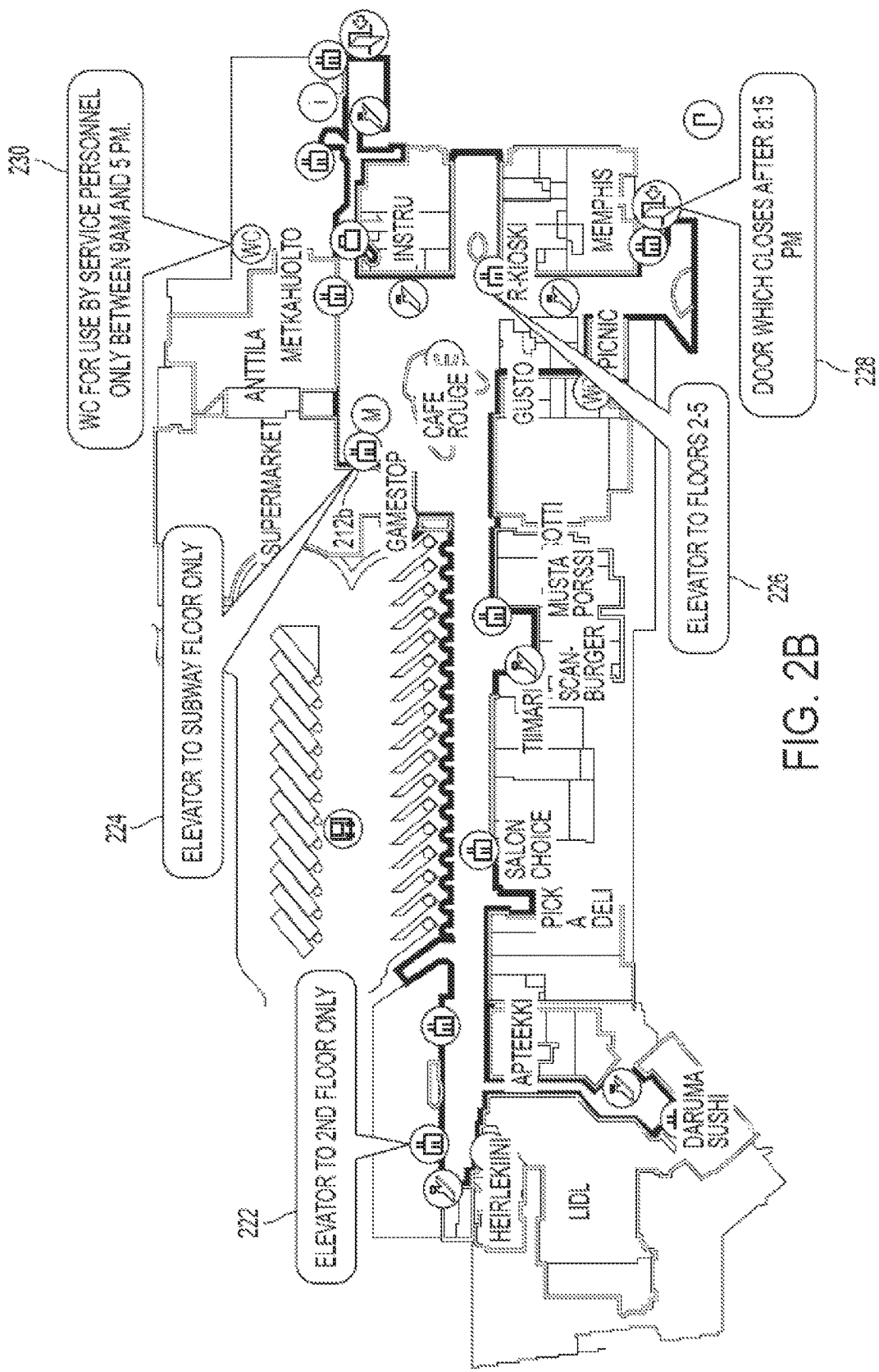

The above processes can be applied to the example of FIGS. 2A and 2B.

FIG. 2A illustrates a map of an indoor area of a premises, such as a shopping center. For illustrative purposes, the area 200 shown in FIG. 2A is on a single floor, although the term area may refer to a portion of a premises located on one or more floors. Area 200 includes a number of labeled structures, each of which may be considered a sub-area of area 200. For example, sub-areas 202 ("Lidl") and 204 ("R-Kioski") may represent two shops in the premises. Also shown in FIG. 2A are walls 206 defining structural boundaries of sub-areas and connecting symbols 210, 212a-212c, 214, 216 and 218, representing connectors between areas or sub-areas such as doors, elevators, escalators, or stairways, as well as sub-areas of interest such as restrooms.

Other sub-areas may exist within area 200, and other symbols may be used to illustrate various other connectors or features of interest in an area, for which semantic information may be generated by the system 100 if desired.

As will be appreciated from FIG. 2A, several connectors may exist between and among various areas or sub-areas within the premises. It is often desirable to identify the most efficient or expeditious usage of appropriate connectors to establish a route between two points of interest. However, it is known that access to some connectors may be limited to particular time periods, or to particular groups (classes) of users (as described previously). Moreover, a particular connector may have access only to some of the sub-areas within the structure. For example, a particular door 210 may only be available for emergency use. Similarly, a given staircase 216 or elevators 212a, 212b and 212c may be accessible at only some floors or may have doors which only open to specific other floors. In the same manner, some doors, staircases elevators or restrooms may be accessible only to service or supervisory personnel but not to the general public.

It is therefore desirable to provide to a user a map which, in addition to illustrating the physical structures, areas or sub-areas of a premises, provides semantic information on the map describing accessibility information for the various connectors or sub-areas. FIG. 2B illustrates one form of semantic information which may be generated in accordance with certain embodiments to be provided to a user in addition to the map of FIG. 1A. For simplicity, various reference numeral labels associated with FIG. 2A have been omitted, and the semantic information added is shown superimposed on the map at reference numerals 222, 224, 226, 228 and 230.

More specifically, reference numeral 222 illustrates information which may be generated and displayed on a map provided to a user to indicate that a particular connector (illustrated by an elevator symbol at reference numeral 212a of FIG. 2A) may only be used to access the second floor. Reference numeral 224 illustrates information which may be displayed on a map provided to a user to indicate that another elevator (illustrated by an elevator symbol at reference numeral 212b of FIG. 2A) may only be used to access the subway floor. Reference numeral 226 illustrates information which may be displayed on a map provided to a user to indicate that a particular elevator (illustrated by an elevator symbol at reference numeral 212c of FIG. 2A) may only be used to access the second through fifth floors. Reference numeral 228 illustrates information which may be displayed on a map provided to a user to indicate that a particular door (illustrated by a door symbol at reference numeral 210 of FIG. 2A) is closed after 8:15 PM. Reference numeral 230 illustrates information which may be displayed on a map provided to a user to indicate that a particular restroom (illustrated by a symbol "WC" at reference numeral 218 of FIG. 2A) is only available for service personnel between the hours of 9 AM and 5 PM.

As may be appreciated from FIG. 2B, the platforms 103 of FIG. 1 may automatically generate, display and/or update semantic information on a map showing inter-area connectivity and accessibility of connectors (as well as sub-areas or areas of interest in the premises), based on time, location and classification of user. It is contemplated that other criteria may be also used as necessary or appropriate to generate, display or update the semantic information.

In order to provide more accurate semantic information from a user trace generated by a less accurate positioning system, the platforms 103 combines a plurality of user trace patterns with usage characteristics of building elements to determine properties of the building elements. For example, it can be readily determined which floors of the premises 113 are connected by some elevator. To ensure greater accuracy, the platforms 103 use data which is confirmed by a large number of user traces. Inasmuch as users move with different speeds/tracks and also have different cellular (telephonic or other) devices with different radio characteristics, it is assumed, in some embodiments, that errors in the traces are sporadic and not systematic.

Figure 3:
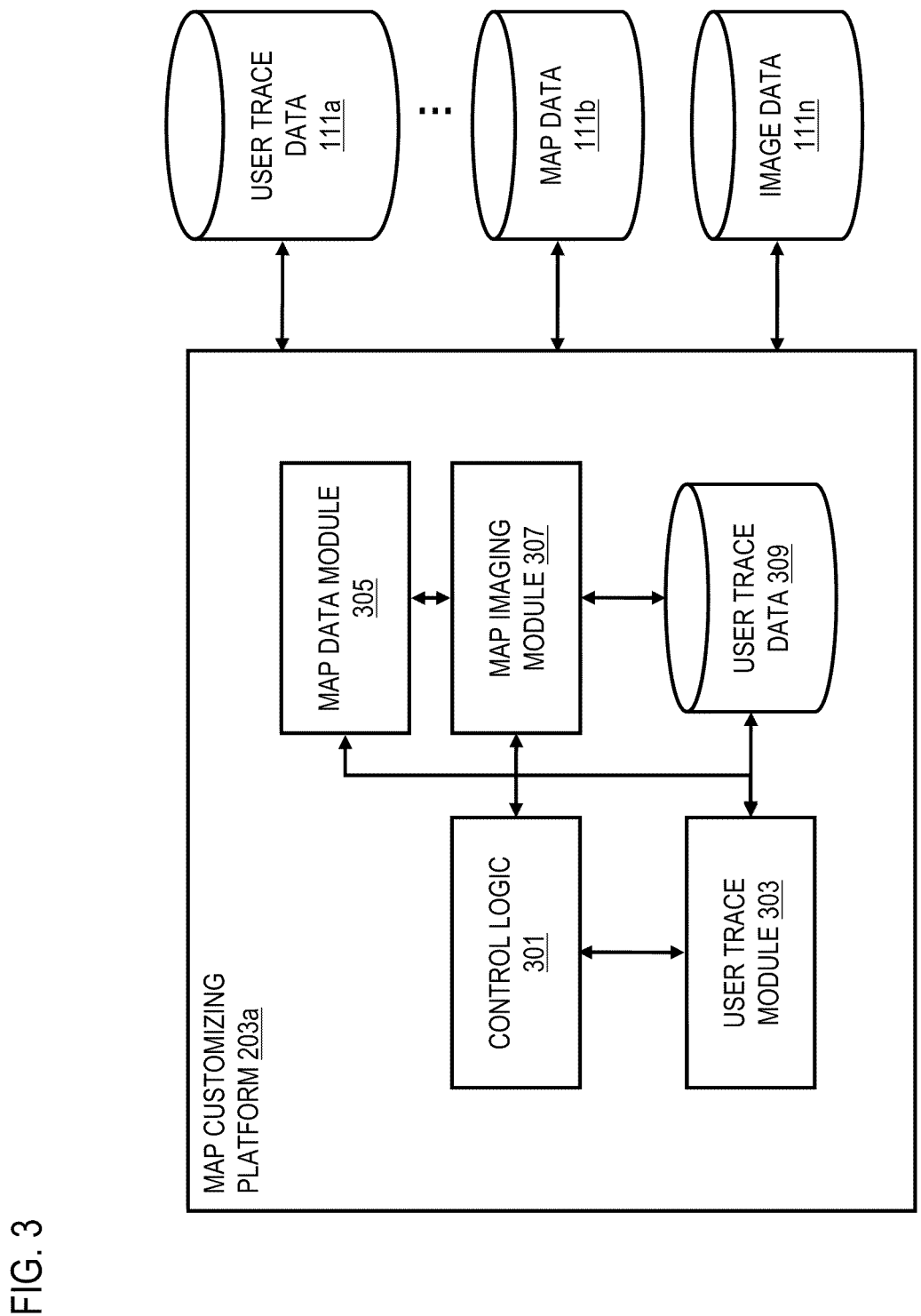
FIG. 3 is a diagram of user trace collection and processing components of the system, according to one embodiment.

FIG. 3 is a diagram of the components of the map customizing platform 103a, according to one embodiment. By way of example, the map customizing platform 103a includes one or more components for customizing map presentations by adding building semantics thereto based on user traces. It is contemplated that the functions of these components may be combined in one or more components or performed by other components of equivalent functionality. In this embodiment, the map customizing platform 103a includes at least a control logic 301 which executes at least one algorithm for executing functions of the map customizing platform 103a, and a user trace module 303 for collecting and/or determining user traces according to various embodiments. For example, the user trace module 303 automatically tracks the traces of users in the premises who visit a particular area within the premises (e.g., an electronic store) using a built-in GPS receiver, WLAN or Bluetooth communication system, or communicating with a radio frequency identification (RFID) tag via an internal RF component. In addition or alternatively, the user trace module 303 collects time data on user traces based on the length of time to traverse a particular trace, between particular areas of the remises. In another embodiment, the user trace module 303 works in conjunction with the control logic 301 to process the media present on a user's device to determine the particular user's location. The map customizing platform 103a also includes a map data module 305 for retrieving and manipulating map data of the premises, for example, and a map imaging module 307 for presenting the processed map data together with the building semantic data. The map data module 305 can collect map data via an independent map-making component or in conjunction with the receivers or communication systems. In addition or alternatively, the map data module 305 retrieves map data from the map service platform 103b. The map imaging module 307 can work independently or in conjunction with the imaging service platform 103n to image the semantic data on a map (e.g., of a building, a floor within a building or an area or a sub-area thereof, etc.) or on parts of the maps. The semantic data may be presented with visual effects including, but not limited to, 1D, 3D, holographs, animation, miniature sets and models, animatronics, Matte paintings, augmented reality, etc. In addition, the platform 103a is connected to the user trace database 309 for storing user trace data which are either retrieved externally or collected via the user trace module 303.

Alternatively, the functions of the map customizing platform 103a can be implemented via a map customizing application (e.g., a widget) 107 in the user equipment 101 according to another embodiment. Widgets are light-weight applications, and provide a convenient means for presenting information and accessing services. It is contemplated that the functions of these components may be combined in one or more components or performed by other components of equivalent functionality. In this embodiment, the map customizing application 107 includes modules similar to those of the map customizing platform 103a, as previously described. To avoid data transmission costs as well as to save time and battery, its control logic can fetch map and/or user trace data cached or stored in its own database, without requesting data from any servers or external platforms, such as the map customizing platform 103a, the map service platform 103b and the imaging service platform 103n. Usually, if the user equipment is online, data queries are made to online search server backends, and once the device is off-line, searches are made to off-line indexes locally.

Figure 4:
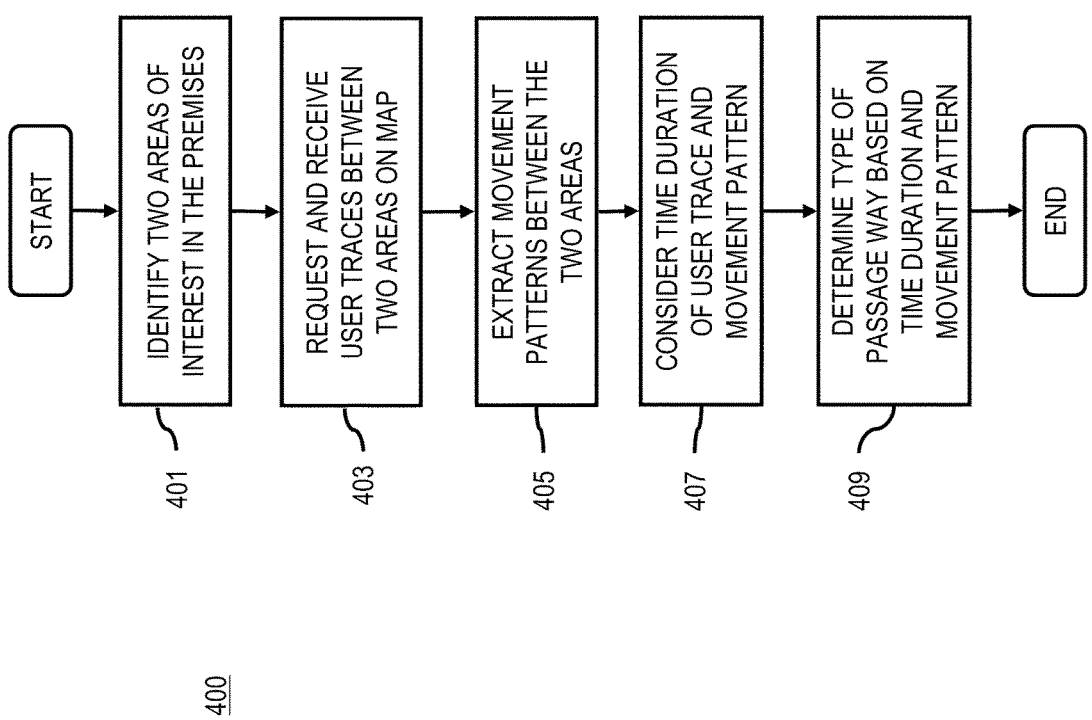
FIG. 4 is a flowchart of a process for extracting building semantics from inaccurate indoor user traces, according to one embodiment.

FIG. 4 is a flowchart of a process 400 for customizing map presentations based on user traces, according to one embodiment. In the illustrated embodiment, the map customizing platform 103a determines whether two areas are connected for pedestrian access, such as considering areas having no walls between each other or having building connector elements between them. Customizing platform 103*a* performs the process 400 and is implemented in, for instance, a chip set including a processor and a memory as shown FIG. 5. In step 401, the map customizing platform 103*a* identifies two areas of interest in the premises. The areas may be identified by recursive operation and consideration of each area within the premises, by user input (whether automatically provided by the user equipment or by manual operation of the same) or by any other manner such as identification the existence of a connection between the areas as described above. At step 403, upon detecting the presence of one or more mobile devices within a premises, the map customizing platform 103*a* collects user traces between the selected areas, such as by obtaining trace data from user trace database 111*a* for use by user trace module 303.

Alternatively, a user may provide trace data directly by inputting the same to the user equipment 101, either for direct transmission to the trace database 111*a* or for recordation and storage within the user equipment to be uploaded to the trace database 111*a* when more convenient, or when communication thereto is available. In that regard, the control logic 301 may be programmed to consider as possible areas of interest those areas for which user traces lead from a first area directly to a second area, within particular time constraints and without having stops at other areas.

At step 405 movement patterns between the two areas of interest are extracted to determine how users move from the first area to the second, both in time and location. This step may be used to identify doors between particular sub-areas of interest. In many cases, there may be several doors which connect two areas, but not all of them may be usable (e.g., a door may only be available for emergency usage). To clarify such a situation, once movement patterns are extracted the system may check if the user traces are close to one door. If the positioning system's accuracy is not sufficient to obtain useful positioning of traces for such a comparison, different walking times to different doors may be calculated. Such a calculation may be used in a situation where the doors are not directly close to each other, and result in differences the walking time between areas. Under such circumstances the differences in walking times of the traces identify which door(s) are (is) being used.

In step 407, by considering whether, during the time of a particular user trace, the user was able to receive signals and position information, the map customizing platform 103*a* can determine that the user passed through a door or on an escalator (which do not obstruct communication) or, that the user was on an elevator or in a stairwell, which disrupt communication. Per step 409, the type of connector or passage way is determined using the time duration and movement pattern.

For example, if the user trace is determined to represent user movement in an elevator or stairs, a determination that a long time was taken leads to a conclusion that the user was on stairs, while a short time was taken, then it is concluded that an elevator was used. It is appreciated that, where position accuracy within a building is incapable of differentiating among stairs, escalators or elevators, the map customizing platform 103*a* can take into consideration various factors as follows. Use of stairs will have considerable travel time variation with different users and, thus, existence of similar user traces between floors with significant time variations is indicative that traverse between floors was by a staircase. Use of escalators, on the other hand, will provide traverse between floors with fairly similar travel times. Moreover, elevators typically combine waiting times at constant positioning with faster travel (together with possible unavailability of user position data when in the elevator), thus providing both clear differences in travel time and movement patterns between use of stairs or elevators for travel between different floors.

It should be noted that, where the accuracy of the positioning data is not sufficient to identify the connector, it may nonetheless be determined that the areas are connected, and that the user can identify the appropriate connector. In such situations signals may be provided to the user, to enable the user to provide feedback information to the system in order to add such detailed information to the map data with high reliability, or to check on existence or location of a connector where reliability is not high enough. Towards that end, users may be prompted when they are in the right location to identify building element properties and to confirm the results of the approach used herein.

Where it is to be determined whether a movement pattern represents movement between areas on the same floor, typical walking time for specific distances between specific areas may be compared with the patterns. If sufficient accuracy is not available, such times may be calculated for traces which would traverse different doors that are not close to each other, thereby identifying particular doors being used at particular times. In circumstances in which accuracy of the data suffices, the specific door being used is more easily identifiable by noting proximity of traces to the specific door.

In processing the user trace data to generate the semantic displays, various substeps of the flow chart may be implemented, such as considering user proximity to several available connectors before changing floors, the use of an existing map to identify options (e.g., walking, using stairs, escalators or an elevator) for movement between the areas and the possibility that, for a map which is not sufficiently detailed, an elevator or other connector may exist though not yet on the map.

It should also be appreciated that, due to variability of characteristics of individual users, data included in user traces between the same points will tend to vary and, accordingly, that statistical analysis of a sufficient number of traces may be used to obtain a correlation among the traces and to more accurately identify the accessibility and availability of specific connectors at specific times. Average values of position and time data may be taken from numerous traces, as could least squares deviations of the data from a candidate for a particular path.

It should also be recognized that some connecting elements of a building (e.g., doors) may be closed during some times of the day or week. In this case, it is possible to extract useful data from other users, though full reliability may be difficult in such circumstances. In accordance with certain embodiments, it is intended to extract typical times of the day when doors are open and to report this information to all users. This can be done if sufficient amounts of data sets are available. However, if no people pass through some building elements during other times, this could be because an area is closed, unsafe or just locked at this time of the day.

If some areas are not at reached by user traces, it may be concluded that these areas are not accessible for users, similarly to the previous description. Additionally, although results may be obtained where positioning accuracy is low, it is also possible that, in some cases, positioning may simply not be available in some sections of the building. As previously noted, however, where a reduced number of user traces include a particular connector, this may not be due to deficiencies but to differences in user classification. Thus, building personnel for example, may use some doors not accessible to others. Nonetheless, such a situation may be identified by statistical analysis of the data, for example where the mobile devices include user classification in the data transmitted to the system. Thus, several user groups may be identified, e.g. company employees and externals, which have individual building access and hence connectivity between areas. Typically, local employees spend considerable time inside buildings, which permits differentiation of employee data from that of other visitors.

Certain identified routes may have particular travel times which may be caused by situations where users may have to queue (at elevators or security checks). These travel times can also depend on user profile and constraints (e.g. wheelchair access). Such particular times are taken into consideration when comparing user traces to identify a building connector.

Thus, there exist a number of criteria for differentiating among different building elements or connectors which are utilized in the user traces, thereby permitting identification of specific connectors at specific times for traversing between particular areas and sub-areas of the premises, and generation of display data to provide to a user equipment 101 for display on a map as illustrated in FIG. 2B.

The above processes and arrangements, according to certain embodiments, provide automatic creation of map content identifying which areas of a building are connected to which other areas by statistical extraction of information from user traces. Also, indoor positioning system information that identifies inter-area access is provided to a user, describing to the user connectivity of various areas of a premises, thereby simplifying routing of people within the premises. Inter-area connectivity information is provided as semantic data on a map display of the building. Further, different levels of inter-area access available to different classes of users can be identified.

The processes described herein for providing building semantics from inaccurate indoor user traces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
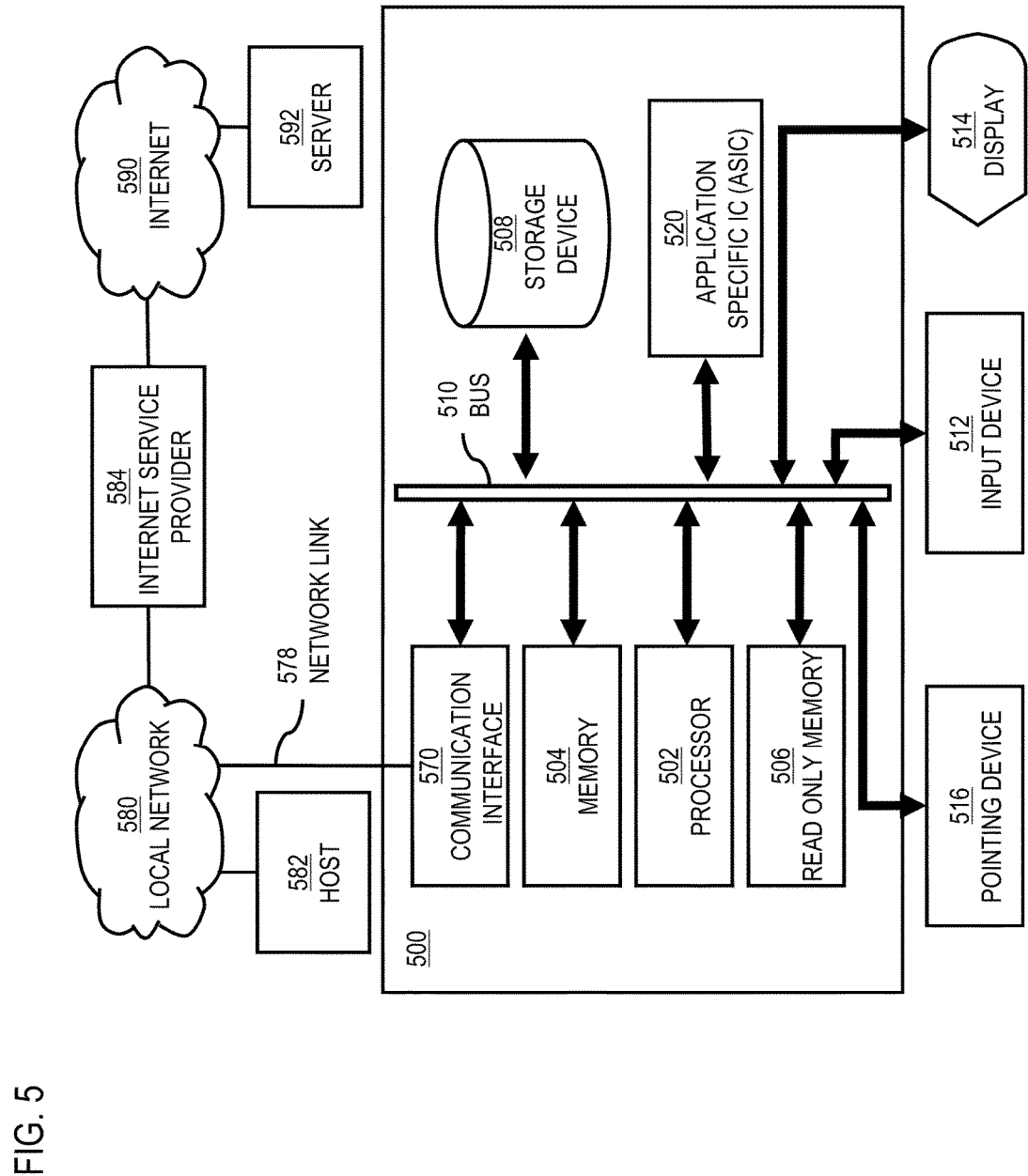
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide building semantics from inaccurate indoor user traces as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing building semantics from inaccurate indoor user traces.

Bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to providing building semantics from inaccurate indoor user traces. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions to provide building semantics from inaccurate indoor user traces. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing building semantics from inaccurate indoor user traces is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing building semantics from inaccurate indoor user traces to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
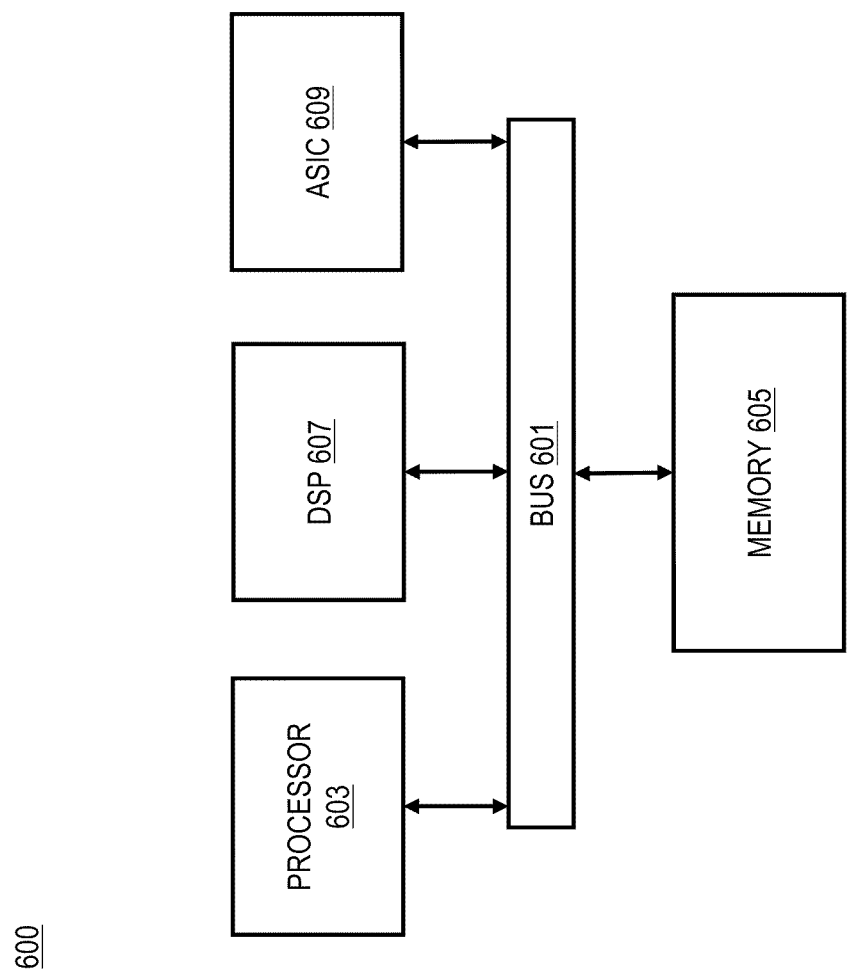
FIG. 6 is a diagram of a chip set that can be used to implement an embodiment of the invention.

FIG. 6 illustrates a chip set 600 upon which an embodiment of the invention may be implemented. Chip set 600 is programmed to provide building semantics from inaccurate indoor user traces as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of providing building semantics from inaccurate indoor user traces.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide building semantics from inaccurate indoor user traces. The memory 605 also stores the data associated with or generated by the execution of the inventive steps.

FIG. 7 is a diagram of exemplary components of a mobile terminal (e.g., handset) for communications, which is capable of operating in the system of FIG. 2, according to one embodiment. In some embodiments, mobile terminal 700, or a portion thereof, constitutes a means for performing one or more steps of providing building semantics from inaccurate indoor user traces. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing building semantics from inaccurate indoor user traces. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide building semantics from inaccurate indoor user traces. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
detecting presence of one or more mobile devices within a premises;
generating trace data corresponding to the one or more mobile devices, wherein the trace data comprises a time duration and movement pattern of the one or more mobile devices within the premises;
retrieving a stored version of a map of the premises;
updating the stored version of the map of the premises by including accessibility information about the premises and by determining a type of at least one connecting element between two areas of the premises based on the trace data, wherein a type of connecting element is determined based on the time duration, whether communication was disrupted, and movement pattern, and wherein the accessibility information is based on at least one of business hours and temporary conditions in the premises,
determining a property of the at least one connecting element by using the determined accessibility information, wherein the property of a connecting element is one of a door, an elevator, an escalator, and a stairway; and generating a message for transmission to the one or more mobile devices associated with a user, wherein the message prompts the user to provide feedback information about the determined property when the user is positioned near a location point within the premises to verify the determined property.

2. A method of claim 1, wherein identifying at least one connecting element between two areas of the premises comprises:
sending a message to at least one mobile device requesting confirmation of the at least one connecting element; and
receiving feedback information from the mobile device.

3. A method of claim 1, further comprising:
determining position information of the one or more mobile devices over a predetermined time interval, wherein the trace data is generated based on the position information.

4. A method of claim 1, wherein the premises includes a plurality of areas, the plurality of areas comprising at least one floor, at least one hallway, and at least one room.

5. A method of claim 1, further comprising:
causing, at least in part, storage of trace data within a database configured to store a plurality of trace data; and
determining whether the trace data and another one of the trace data corresponds to a common user identifier.

6. A method of claim 1, further comprising:
retrieving a user profile of a user associated with one of the mobile devices, wherein the user profile includes classification of the user; and
filtering the trace data based on the classification of the user.

7. An apparatus comprising:
at least one processor; and
at least one memory including computer program code,
the at least one memory and the computer program code configured to, with the at least one processor, cause the apparatus to perform at least the following:
detect a presence of one or more mobile devices within a premises;
generate trace data corresponding to the one or more mobile devices, wherein the trace data comprises a time duration and movement pattern of the one or more mobile devices within the premises;
retrieving a stored version of a map of the premises; and
updating the stored version of the map of the premises by including accessibility
information about the premises and by determining a type of at least one connecting element between two areas of the premises based on the trace data, wherein a type of connecting element is determined based on the time duration, whether communication was disrupted, and movement pattern, and wherein the accessibility information is based on at least one of business hours and temporary conditions in the premises,
the apparatus is further caused, at least in part, to determine a property of the at least one connecting element by using the determined accessibility information, wherein the property of a connecting element is one of a door, an elevator, an escalator, and a stairway; and
generate a message for transmission to the one or more mobile devices associated with a user, wherein the message prompts the user to provide feedback information about the determined property when the user is positioned near a location point within the premises to verify the determined property.

8. An apparatus of claim 7, wherein when identifying at least one connecting element between two areas of the premises, the apparatus is further caused, at least in part, to send a message to at least one mobile device requesting confirmation of the at least one connecting element; and receive feedback information from the mobile device.

9. An apparatus of claim 7, wherein the apparatus is further caused, at least in part, to determine position information of the one or more mobile devices over a predetermined time interval, wherein the trace data is generated based on the position information.

10. An apparatus of claim 7, wherein the premises includes a plurality of areas, the plurality of areas comprising at least one floor, at least one hallway, and at least one room.

11. An apparatus of claim 7, wherein the apparatus is further caused, at least in part, to:
store of trace data within a database configured to store a plurality of trace data; and
determine whether the trace data and another one of the trace data corresponds to a common user identifier.

12. An apparatus of claim 7, wherein the apparatus is further caused, at least in part, to:
retrieve a user profile of a user associated with one of the mobile devices, wherein the
user profile includes classification of the user, and filter the trace data based on the classification of the user.

13. A non-transitory computer-readable storage medium carrying one or more sequences of one or more instructions which, when executed by one or more processors, cause an apparatus to perform at least the following steps:
detecting a presence of one or more mobile devices within a premises;
determining position information of the one or more mobile devices over a predetermined time interval;
generating trace data corresponding to the one or more mobile devices using the position information, wherein the trace data comprises a time duration and movement pattern of the one or more mobile devices within the premises;
retrieving a stored version of a map of the premises;
updating the stored version of the map of the premises by including accessibility information about the premises and by determining a type of at least one connecting element between two areas of the premises based on the trace data, wherein a type of connecting element is determined based on the time duration, whether communication was disrupted, and movement pattern, and wherein the accessibility information is based on at least one of business hours and temporary conditions in the premises,
determining a property of the at least one connecting element by using the determined accessibility information, wherein the property of a connecting element is one of a door, an elevator, an escalator, and a stairway; and
generating a message for transmission to the one or more mobile devices associated with a user, wherein the message prompts the user to provide feedback information about the determined property when the user is positioned near a location point within the premises to verify the determined property.

14. A non-transitory computer-readable storage medium of claim 13, wherein the apparatus is caused, at least in part, to further perform:

wherein the premises includes a plurality of areas, the plurality of areas comprising at least one floor, at least one hallway, and at least one room.

15. A non-transitory computer-readable storage medium of claim 13, wherein the apparatus is caused, at least in part, to further perform:
  causing, at least in part, storage of trace data within a database configured to store a plurality of trace data; and
  determining whether the trace data and another one of the trace data corresponds to a common user identifier.

\* \* \* \* \*